(12) United States Patent
Kosaka (10) Patent No.: US 8,822,856 B2
(45) Date of Patent: Sep. 2, 2014

(54) TURN SIGNAL SWITCH DEVICE

(75) Inventor: Ken Kosaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 343 days.

(21) Appl. No.: 13/405,031

(22) Filed: Feb. 24, 2012

(65) Prior Publication Data

US 2012/0217142 A1   Aug. 30, 2012

(30) Foreign Application Priority Data

Feb. 25, 2011   (JP) ................................. 2011-039728

(51) Int. Cl.
*H01H 21/02* (2006.01)
*B60Q 1/42* (2006.01)
*H01H 21/06* (2006.01)

(52) U.S. Cl.
CPC ............... *B60Q 1/425* (2013.01); *H01H 21/06* (2013.01)
USPC ....................................................... 200/61.3

(58) Field of Classification Search
CPC ....... H01H 21/04; H01H 21/06; H01H 25/04; B60Q 1/42; B60Q 1/425
USPC .................................. 200/61.27, 61.3–61.37
See application file for complete search history.

(56) References Cited

U.S. PATENT DOCUMENTS

| 5,672,855 A * | 9/1997 | Uchiyama et al. ............ 200/61.3 |
| 6,186,022 B1 * | 2/2001 | Ishikawa ....................... 200/61.3 |
| 6,677,543 B2 * | 1/2004 | Takahashi et al. ............ 200/61.3 |
| 8,552,319 B2 * | 10/2013 | Nakamura et al. .......... 200/61.27 |

FOREIGN PATENT DOCUMENTS

JP      10-269901      10/1998

* cited by examiner

*Primary Examiner* — Felix O Figueroa
(74) *Attorney, Agent, or Firm* — Brinks Gilson & Lione (57) ABSTRACT

A turn signal switch device includes an operation lever, a holding member configured to support a base portion of the operation lever and to be turnable together with the operation lever, a housing configured to support the holding member such that the holding member is turnable, a cancel lever provided in the housing and configured to be advanceable, retractable, and turnable along with the turning of the holding member, and a cam member provided in the housing and facing the base portion of the operation lever. The housing holds a third elastic member configured to elastically urge the cancel lever toward a turning locus of a cancel projection. The third elastic member is a coil spring.

4 Claims, 9 Drawing Sheets

FIG. 9B

TURN SIGNAL SWITCH DEVICE

CLAIM OF PRIORITY

This application claims benefit of Japanese Patent Application No. 2011-039728 filed on Feb. 25, 2011, which is hereby incorporated by reference.

BACKGROUND

1. Field of the Disclosure

The present disclosure relates to turn signal switch devices each including an operation lever configured to be turnable from a neutral position to at least a left-turn-indicating position and a right-turn-indicating position, and in particular to a turn signal switch device in which the operation lever automatically returns from the left-turn-indicating position or the right-turn-indicating position to the neutral position when a steering wheel having been turned in one direction is turned in the reverse direction.

2. Description of the Related Art

A turn signal switch device is provided at the driver's seat of an automobile and includes an operation lever that is turnably attached to a housing that is attached to a steering column. A switch that is driven when the operation lever is turned is provided in the housing so that, when the operation lever is turned from a neutral position to a left-turn-indicating position or a right-turn-indicating position, a corresponding one of a left-turn indicator lamp and a right-turn indicator lamp blinks.

The housing has a cam surface on the inner side thereof so as to guide the operation lever that is turned. When the operation lever is turned, a driven member is driven to slide along the cam surface. The operation lever is latchable at the left-turn-indicating position and at the right-turn-indicating position. The turn signal switch device includes a cancel mechanism. In the cancel mechanism, when the steering wheel having been turned in an intended direction is turned in the reverse direction, the operation lever automatically returns to the neutral position from a corresponding one of the left-turn-indicating position and the right-turn-indicating position. An exemplary turn signal switch device including such a cancel mechanism is disclosed by Japanese Unexamined Patent Application Publication No. 10-269901.

The cancel mechanism of the related-art turn signal switch device includes a first lever member that is advanceable to a position over and retractable from a turning locus of a cancel projection that is configured to turn together with a steering shaft. The first lever member is configured to be advanceable/retractable and turnable in conjunction with the turning of an operation lever and the turning of the cancel projection, enabling the operation lever to automatically return to the neutral position. The related-art turn signal switch device also includes a second lever member configured to operate in conjunction with the cancel projection. The second lever member is supported in such a manner as to be advanceable toward/retractable from and turnable with respect to the first lever member, which is turnably supported by a housing. Therefore, the device includes an increased number of components, making it difficult to reduce manufacturing costs of the device.

In the cancel mechanism, the second lever member needs to be elastically urged constantly toward the cancel projection. The related-art turn signal switch device employs a helical torsion spring as an elastic urging member. The helical torsion spring extends from an inner peripheral portion of the housing toward the second lever member. Therefore, a space for the helical torsion spring needs to be provided inside the housing, making it difficult to reduce the size of the housing.

SUMMARY

In light of the above, the present disclosure provides a turn signal switch device that includes a cancel mechanism having a simple configuration with a reduced number of components and a housing having a reduced size.

To solve the above problems, a turn signal switch device according to an aspect of the present disclosure includes an operation lever; a holding member configured to support a base portion of the operation lever such that the operation lever is turnable in a first plane; a housing configured to support the holding member such that the holding member is turnable in a second plane intersecting the first plane; a cancel lever provided in the housing with a cancelling elastic member in a contracted state interposed therebetween, the cancel lever being configured to be turnable and to be advanceable to a position over and retractable from a turning locus of a cancel projection provided to a steering shaft; a cam member provided in the housing and facing the base portion of the operation lever; and a first driven member provided at the base portion of the operation lever with a first elastic member interposed therebetween, the first driven member being elastically in contact with the cam member. The cam member includes a central portion configured to anchor the first driven member when the operation lever is at a neutral position, latching projections each configured to anchor the first driven member at least when the operation lever is at a corresponding one of a left-turn-indicating position and a right-turn-indicating position, and a sloping surface extending in a portion excluding the central portion and the latching projections and configured to elastically urge the first driven member toward the central portion. The cancel lever includes an engaging projection including a surface having a first apex on a side of the engaging projection nearer to the turning locus. The holding member includes an engaging portion including a surface having a second apex configured to come into contact with the engaging projection when the operation lever is at the neutral position. When the operation lever is at the neutral position, the cancel lever is retracted from the turning locus.

In the turn signal switch device according to the above aspect of the present disclosure, the cancel lever preferably includes a projection projecting toward the turning locus and configured to be advanceable to the position over and retractable from the turning locus, two arms having a recess therebetween and extending in a direction opposite to a direction in which the projection projects, and a downward projection projecting toward an inner surface of the housing. Furthermore, the housing preferably has an oblong guide hole along which the downward projection is guided in such a manner as to be movable back and forth with respect to the turning locus. Furthermore, the holding member is preferably provided with a second driven member with a second elastic member interposed therebetween such that the second driven member is elastically in contact with an inner side surface of the cancel lever defining the recess.

In the turn signal switch device according to the above aspect of the present disclosure, the holding member preferably includes a projecting portion projecting toward the turning locus and having a receiving hole, the second driven member being guided along the receiving hole in such a manner as to be movable back and forth. Furthermore, the second driven member preferably includes a pushed portion extending through the receiving hole into the recess and pressed against the inner side surface of the cancel lever defining the recess.

In the turn signal switch device according to the above aspect of the present disclosure, the cam member is preferably provided on one side of the projecting portion, and the cancel lever is preferably provided on another side of the projecting portion. Furthermore, the engaging portion is preferably provided on the projecting portion and is preferably positioned on a side of the receiving hole nearer to the turning locus.

In the turn signal switch device according to the above aspect of the present disclosure, the cancel lever preferably includes a holding portion projecting in the direction in which the two arms extend. Furthermore, the housing preferably includes a cancel-lever-holding portion facing the holding portion. Furthermore, the cancelling elastic member preferably has one end thereof held by the holding portion and another end thereof held by the cancel-lever-holding portion.

With the turn signal switch device according to the above aspect of the present disclosure, the cancel lever is provided in the housing with the cancelling elastic member in a contracted state interposed therebetween such that the cancel lever is advanceable to a position over and retractable from the turning locus of the cancel projection and is turnable back and forth. Thus, the cancelling elastic member and the cancel lever are each formed of one component. Consequently, a cancel mechanism having a reduced number of components and a simple configuration is provided. Moreover, the individual components can each be provided in a small space. Consequently, the size of the turn signal switch device can be reduced. Furthermore, the first driven member is attached to the base portion of the operation lever with the first elastic member interposed therebetween such that the first driven member is elastically in contact with the cam member. Thus, the elastic member for the operation lever and the elastic member for the cancel mechanism are provided as separate components. Consequently, the design flexibility increases, realizing a turn signal switch device that provides a superior feeling of operation.

Furthermore, with the turn signal switch device according to the above aspect of the present disclosure, even if the operation lever having been latched at the right-turn-indicating position or the left-turn-indicating position is locked there, the operation lever can be made to assuredly return to the neutral position automatically when the steering wheel is returned to its initial position after a right turn or a left turn is made.

Furthermore, with the turn signal switch device according to the above aspect of the present disclosure, even if the operation lever that have been latched is locked, the operation lever can be made to assuredly return to the neutral position automatically with a simple configuration. Furthermore, spaces above and below the projecting portion are efficiently used by providing the cam member and the cancel lever, respectively, leading to a further reduction in the size of the turn signal switch device. Furthermore, the above configuration contributes to a simple mechanism that assuredly allows the cancel lever to advance to a position over and retract from the turning locus of the cancel projection and to turn back and forth. Thus, the reliability of the turn signal switch device increases, and the size of the turn signal switch device is further reduced.

DESCRIPTION OF THE PREFERRED EMBODIMENTS

Figure 1:
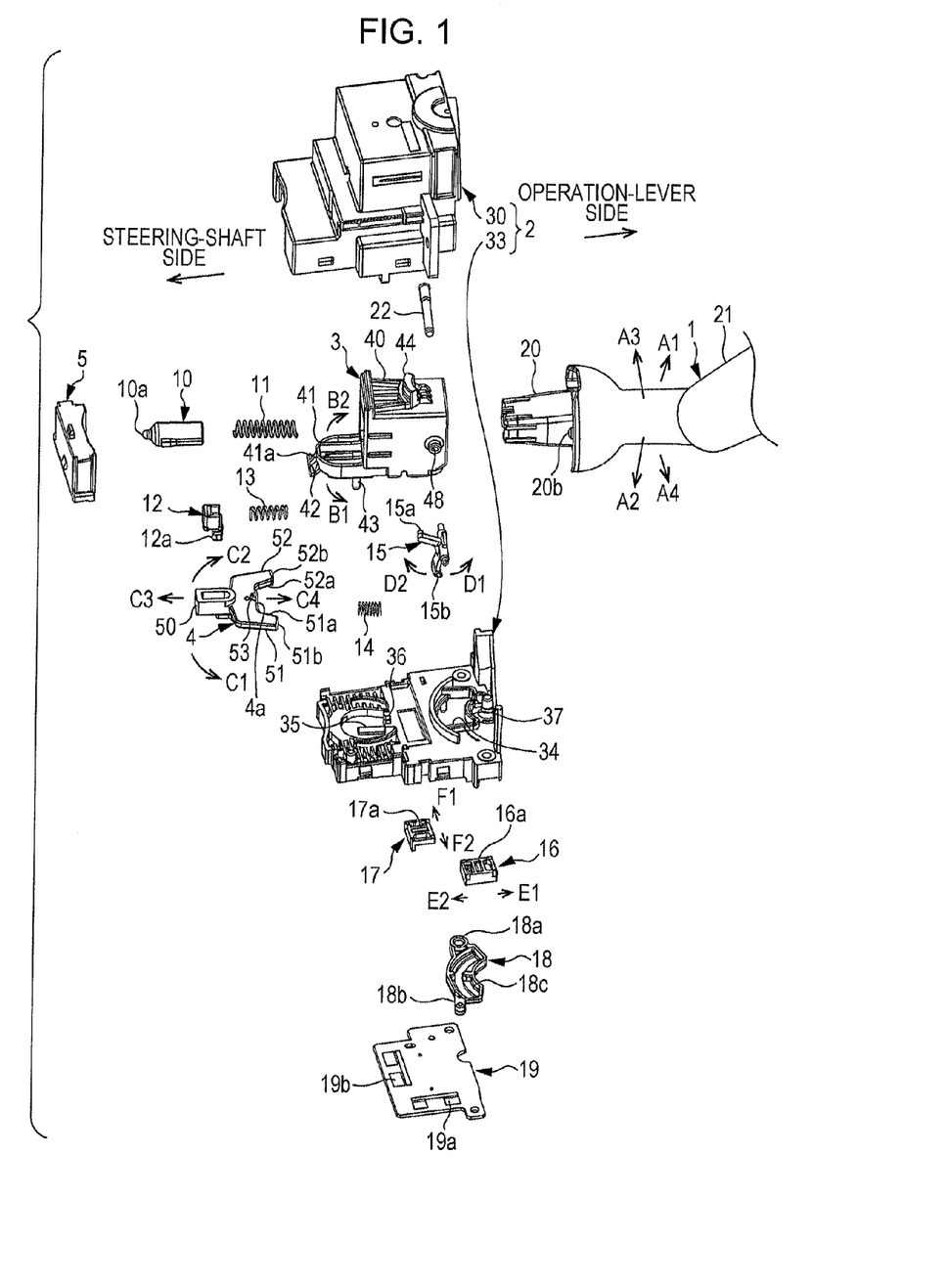
FIG. 1 is an exploded perspective view of a turn signal switch device according to an embodiment of the present disclosure.

Embodiments of the present disclosure will now be described in detail with reference to the accompanying drawings. FIG. 1 is an exploded perspective view of a turn signal switch device according to an embodiment of the present disclosure. The turn signal switch device includes a housing 2 and an operation lever 1. The housing 2 is provided in a steering column of an automobile. The operation lever 1 extends outward from the housing 2 and is exposed in the body of the automobile.

The operation lever 1 is turnable in four directions A1 to A4 illustrated in FIG. 1. The directions A1 and A2 are defined in a plane that is parallel to a first plane that is orthogonal to the axis of a below-described guide projection 44. The directions A3 and A4 are defined in a plane that is parallel to a second plane that intersects the first plane, the second plane being orthogonal to the axis of a below-described shaft 22. When the operation lever 1 is turned in the direction A1 or the direction A2, the operation lever 1 is latched at a left-turn-indicating position or a right-turn-indicating position, whereby the turn signal switch device outputs a left-turn indication or a right-turn indication.

The turn signal switch device is attached to the steering column of the automobile. A steering shaft (not illustrated) is provided on a side of the turn signal switch device opposite the side toward which the operation lever 1 extends. When the operation lever 1 and a steering wheel are operated, a cancel lever 4 included in the turn signal switch device operates in conjunction with the steering shaft.

Turning the operation lever 1 in the direction A3 and in the direction A4 may have any functions, respectively. For example, the operation lever 1 may be configured to be latchable when turned in the direction A4, so that headlights may be switched to high beams. Meanwhile, the operation lever 1 may be configured not to be latchable when turned in the direction A3 and to automatically return to a neutral position, so that the headlights may be turned on only while the operation lever 1 having been turned in the direction A3 is held still.

Referring to FIG. 1, the operation lever 1 includes a base portion 20 and an operated portion 21. The base portion 20 resides in the housing 2. The operated portion 21 is exposed in the body of the automobile and is operated by the driver.

The housing 2 includes an upper case 30 and a lower case 33 that are combined together, with a space provided therein. The base portion 20 of the operation lever 1 and other associated components are set in the space provided in the housing 2. The components that are set in the space in the housing 2 basically include a holding member 3, the cancel lever 4, a cam member 5, a first driven member 10, and a swingable lever 15. In addition, a second driven member 12 is preferably provided in the housing 2.

The holding member 3 includes a box-like body 40 that receives the base portion 20 of the operation lever 1 such that a side of the base portion 20 nearer to the cam member 5 is exposed. The body 40 preferably includes a projecting portion 41 and the guide projection 44. The projecting portion 41 projects toward a side on which the steering shaft is provided (hereinafter referred to as steering-shaft side). The guide projection 44 projects from the top of the body 40. The guide projection 44 is supported by the housing 2 such that the holding member 3 is turnable about the guide projection 44. Therefore, when the operation lever 1 is turned in the direction A1 or the direction A2, the projecting portion 41 of the holding member 3 turns in a direction B1 or a direction B2. The base portion 20 is supported by the holding member 3 in such a manner as to be turnable about the shaft 22 that extends through a shaft-receiving portion 20b provided in the base portion 20 and a shaft-receiving portion 48 provided in the holding member 3. Therefore, when the operation lever 1 is turned in the direction A3 or the direction A4, only the operation lever 1 turns while the holding member 3 remains still.

The projecting portion 41 of the holding member 3 has an engaging portion 42 at the bottom tip thereof. The engaging portion 42 engages with and disengages from an engaging projection 53 provided on the cancel lever 4. The engagement and disengagement will be described in detail separately below. The projecting portion 41 has a second-driven-member-receiving hole 41a (receiving hole). The second driven member 12 is guided along the second-driven-member-receiving hole 41a in such a manner as to be movable back and forth (see FIG. 2). As illustrated in FIG. 1, the projecting portion 41 also has a fitting pin 43 at the bottom thereof. The fitting pin 43 is fitted in an oblong hole 17a provided in a below-described second slider 17.

The first driven member 10 is provided in a receiving recess 20a provided in the base portion 20. The first driven member 10 is slidable in the receiving recess 20a with a first elastic member 11 interposed therebetween. The first driven member 10 is elastically urged such that a tip 10a thereof is pressed against the cam member 5 provided opposite the base portion 20. When the operation lever 1 is turned, the first driven member 10 slides via the tip 10a thereof along the cam member 5 in a corresponding one of four directions. Specifically, the cam member 5 has a cam surface 60 that faces the base portion 20. The cam surface 60 has a cross-shaped cam groove (not illustrated) extending in the directions in which the operation lever 1 is turned. The cam groove is deepest at a central portion 60a thereof. The central portion 60a corresponds to the neutral position of the operation lever 1. The cam surface 60 includes sloping surfaces 60b each sloping from the central portion 60a to the periphery of the cam surface 60. Some of the sloping surfaces 60b have below-described latching projections 61 (see FIG. 2), respectively. The first driven member 10 is elastically pressed against the cam groove. Therefore, when the operation lever 1 is turned in any of the four directions and the tip 10a of the first driven member 10 is positioned on any of the sloping surfaces 60b, the operation lever 1 is elastically urged in such a direction as to automatically return to the neutral position with the elastic urging force exerted by the first elastic member 11.

Figure 2:
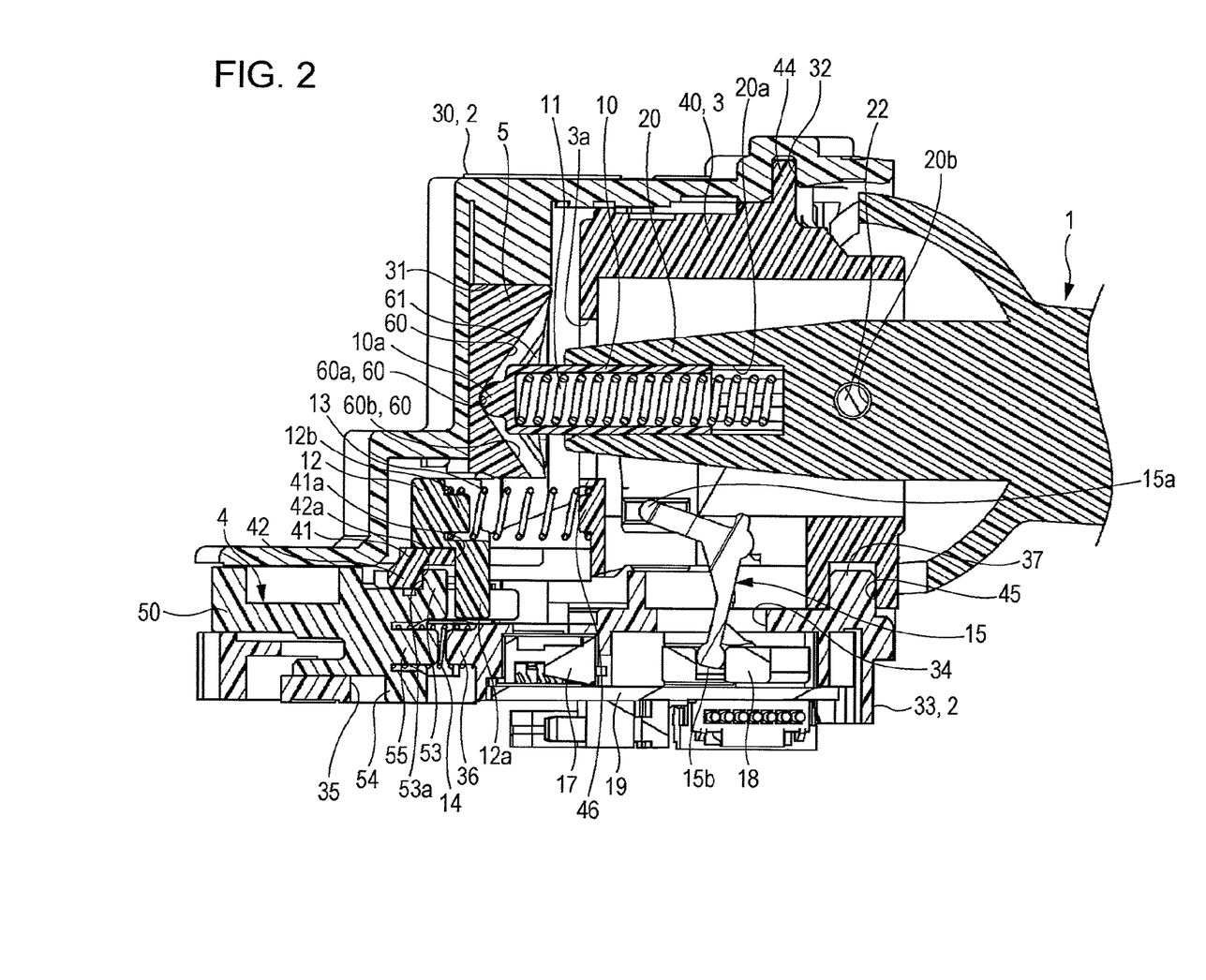
FIG. 2 is a vertical sectional view of the turn signal switch device.

As illustrated in FIG. 2, the second driven member 12 is preferably attached to the holding member 3 with a second elastic member 13 interposed therebetween and is elastically urged toward the steering-shaft side. The second elastic member 13 has one end thereof held by a holding projection 12b included in the second driven member 12 and the other end thereof held by a second-elastic-member-holding portion 46 included in the holding member 3. The second driven member 12 preferably includes a pushed portion 12a projecting downward. The pushed portion 12a is fitted in the second-driven-member-receiving hole 41a provided in the projecting portion 41 of the holding member 3. The pushed portion 12a operates in conjunction with the cancel lever 4, whereby a below-described cancel movement is realized.

The cancel lever 4 preferably includes a projection 50, a first arm 51, and a second arm 52, with a recess 4a provided between the first arm 51 and the second arm 52. The projection 50 projects toward a turning locus of a cancel projection 6a (see FIGS. 3A and 3B) provided to the steering shaft. The first arm 51 and the second arm 52 extend toward a side on which the operation lever 1 is provided (hereinafter referred to as operation-lever side). The first arm 51 includes a first pushing surface 51a that faces the second arm 52. The first pushing surface 51a pushes the pushed portion 12a when the cancel movement is realized after the operation lever 1 is turned in a left-turn-indicating direction (the direction A1). The first arm 51 also includes a second pushing surface 51b that faces a side of the first arm 51 opposite the side toward which the projection 50 projects. The second pushing surface 51b pushes the pushed portion 12a when the cancel movement is realized in a state where the operation lever 1 having been turned in the left-turn-indicating direction (the direction A1) and latched is locked there. The second arm 52 includes a first pushing surface 52a and a second pushing surface 52b functioning the same as the first pushing surface 51a and the second pushing surface 51b when a right-turn indication is made. Such a configuration enables the operation lever 1 to assuredly return to the neutral position automatically when the steering wheel is returned to its initial position after a right turn or a left turn is made, even if the operation lever 1 having been latched at the right-turn-indicating position or the left-turn-indicating position is locked there. This mechanism will be described separately below.

The cancel lever 4 includes the engaging projection 53 on the edge of the upper surface thereof defining the recess 4a at the mid position between the first arm 51 and the second arm 52. Referring to FIG. 2, the lower case 33 preferably includes a third-elastic-member-holding portion 36 (cancel-lever-holding portion). The cancel lever 4 is attached to the third-elastic-member-holding portion 36 with a third elastic member 14 (cancelling elastic member) interposed therebetween. The cancel lever 4 preferably includes a downward projection 54 on the lower surface thereof.

The lower case 33 of the housing 2 preferably has an oblong guide hole 35 that guides the downward projection 54 of the cancel lever 4 such that the downward projection 54 is advanceable toward and retractable from the steering-shaft side, i.e., the turning locus of the cancel projection 6a. Thus, the cancel lever 4 is guided via the downward projection 54 thereof along the oblong guide hole 35 in such a manner as to be advanceable and retractable in a direction C3 and a direction C4 illustrated in FIG. 1 and to be turnable back and forth in a direction C1 and a direction C2 illustrated in FIG. 1 at any position in the oblong guide hole 35.

The cancel lever 4 is constantly elastically urged toward the steering-shaft side by the third elastic member 14 (cancelling elastic member), such as a coil spring, attached to the housing 2. Specifically, as illustrated in FIG. 2, the third elastic member 14 is preferably supported in such a manner as to be constantly contracted between a below-described holding portion 55 and the third-elastic-member-holding portion 36 of the lower case 33.

As illustrated in FIG. 2, the lower case 33 of the housing 2 has an opening 34 and a guide projection 37. A link portion 15b included in the swingable lever 15 extends downward through the opening 34. The guide projection 37 supports the holding member 3 such that the holding member 3 is turnable. The swingable lever 15 includes a support shaft 15a and is supported by the base portion 20 of the operation lever 1 in such a manner as to be swingable about the support shaft 15a. Therefore, when the operation lever 1 is turned in the direction A3 or the direction A4 illustrated in FIG. 1, the swingable lever 15 swings in a direction D1 or a direction D2.

The link portion 15b engages with a turnable member 18 provided below the opening 34 of the lower case 33, thereby turning the turnable member 18. The turnable member 18 includes a fulcrum 18a, a projection 18b, and an arc-shaped engaging portion 18c. The fulcrum 18a is supported by the lower case 33 such that the turnable member 18 is turnable about the fulcrum 18a. The engaging portion 18c engages with the link portion 15b. The projection 18b is provided at an end of the engaging portion 18c opposite the fulcrum 18a. The projection 18b is fitted in an oblong hole 16a provided in a first slider 16. Thus, when the swingable lever 15 swings and causes the turnable member 18 to turn, the first slider 16 slides in a direction E1 or a direction E2 illustrated in FIG. 1.

A substrate 19 includes a first contact portion 19a and a second contact portion 19b. The first slider 16 has a contact point (not illustrated) that comes into contact with the first contact portion 19a. When the swingable lever 15 swings in the direction D1 or the direction D2, the first slider 16 slides in the direction E1 or the direction E2. Thus, the state of contact between the contact point of the first slider 16 and the first contact portion 19a changes.

The second slider 17 provided in the housing 2 is slidable along with the turning of the holding member 3. The fitting pin 43 provided at the bottom of the holding member 3 is fitted in the oblong hole 17a provided in the second slider 17. Therefore, when the holding member 3 turns in the direction B1 or the direction B2, the second slider 17 slides in a direction F2 or a direction F1 illustrated in FIG. 1.

The second slider 17 has a contact point (not illustrated) that comes into contact with the second contact portion 19b. When the second slider 17 slides in the direction F1 or the direction F2, the state of contact between the contact point and the second contact portion 19b changes.

FIG. 2 is a vertical sectional view of the turn signal switch device. The first driven member 10 is supported on the steering-shaft side (the left side in FIG. 2) of the base portion 20 of the operation lever 1 with the first elastic member 11 interposed therebetween. As illustrated in FIG. 2, the tip of the base portion 20 of the operation lever 1 and the tip 10a of the first driven member 10 project from an opening 3a provided in the holding member 3 toward the cam member 5. The tip 10a of the first driven member 10 is in contact with the cam surface 60 of the cam member 5.

As described above, the cam surface 60 has the cam groove extending in four directions from the central portion 60a. Furthermore, the latching projections 61 that latch the operation lever 1 are provided at desired positions in the cam groove. The latching projections 61 are each configured to latch the operation lever 1 when, for example, the headlights are switched to high beams or a left turn or a right turn is indicated. FIG. 2 illustrates a state where the operation lever 1 is at the neutral position, where the tip 10a of the first driven member 10 resides at the central portion 60a of the cam surface 60.

When the operation lever 1 that is in the state illustrated in FIG. 2 is turned in the direction A1 or the direction A2 illustrated in FIG. 1, the tip 10a of the first driven member 10 moves in a direction perpendicular to the page surface of FIG. 2 and climbs up a corresponding one of the sloping surfaces 60b forming the cam surface 60. When the operation lever 1 reaches the left-turn-indicating position or the right-turn-indicating position, the tip 10a of the first driven member 10 engages with a corresponding one of the latching projections 61, whereby the operation lever 1 is latched.

When a force that causes the operation lever 1 having been latched as described above to automatically return to the neutral position is applied to the operation lever 1, the tip 10a of the first driven member 10 goes over the latching projection 61 to the sloping surface 60b, which is on a side of the latching projection 61 nearer to the central portion 60a of the cam groove. Then, the tip 10a of the first driven member 10 goes down the sloping surface 60b of the cam surface 60 and returns to the central portion 60a with the elastic urging force exerted by the first elastic member 11. In this manner, the operation lever 1 having been latched is released and returns to the neutral position.

Part of the inner surface of the upper case 30 of the housing 2 forms a housing portion 31. The cam member 5 is positioned in the housing portion 31. The upper case 30 has a guide recess 32 provided in the inner surface thereof. The guide projection 44 of the holding member 3 is fitted in the guide recess 32. The lower case 33 has the guide projection 37 provided on the inner surface thereof. The guide projection 37 is fitted in a guide recess 45 provided in the bottom surface of the holding member 3. Thus, the holding member 3 is supported by the housing 2 in such a manner as to be turnable in the direction B1 and the direction B2 illustrated in FIG. 1.

As illustrated in FIG. 2, the second-elastic-member-holding portion 46 that holds the second elastic member 13 is provided on a lower part of a side face of the holding member 3 nearer to the turning locus of the cancel projection 6a. The second driven member 12 is supported by the holding member 3 with the second elastic member 13 in a constantly contracted state interposed therebetween. The pushed portion 12a projects downward through the second-driven-member-receiving hole 41a of the holding member 3. In the state illustrated in FIG. 2, the pushed portion 12a of the second driven member 12 that is elastically urged by the second elastic member 13 resides in the recess 4a of the cancel lever 4. When the cancel lever 4 is turned, the first arm 51 or the second arm 52 comes into contact with and pushes the pushed portion 12a.

The lower case 33 of the housing 2 includes the third-elastic-member-holding portion 36 on a surface thereof facing a side face of the cancel lever 4 nearer to the operation lever 1. The cancel lever 4 preferably includes the holding portion 55 that holds the third elastic member 14. The third elastic member 14 is provided between the third-elastic-member-holding portion 36 and the holding portion 55. Such a configuration contributes to a simple mechanism that assuredly allows the cancel lever 4 to advance to a position over and retract from the turning locus of the cancel projection 6a and to turn back and forth. Thus, the reliability of the turn signal switch device increases, and the size of the turn signal switch device is reduced.

Figure 4:
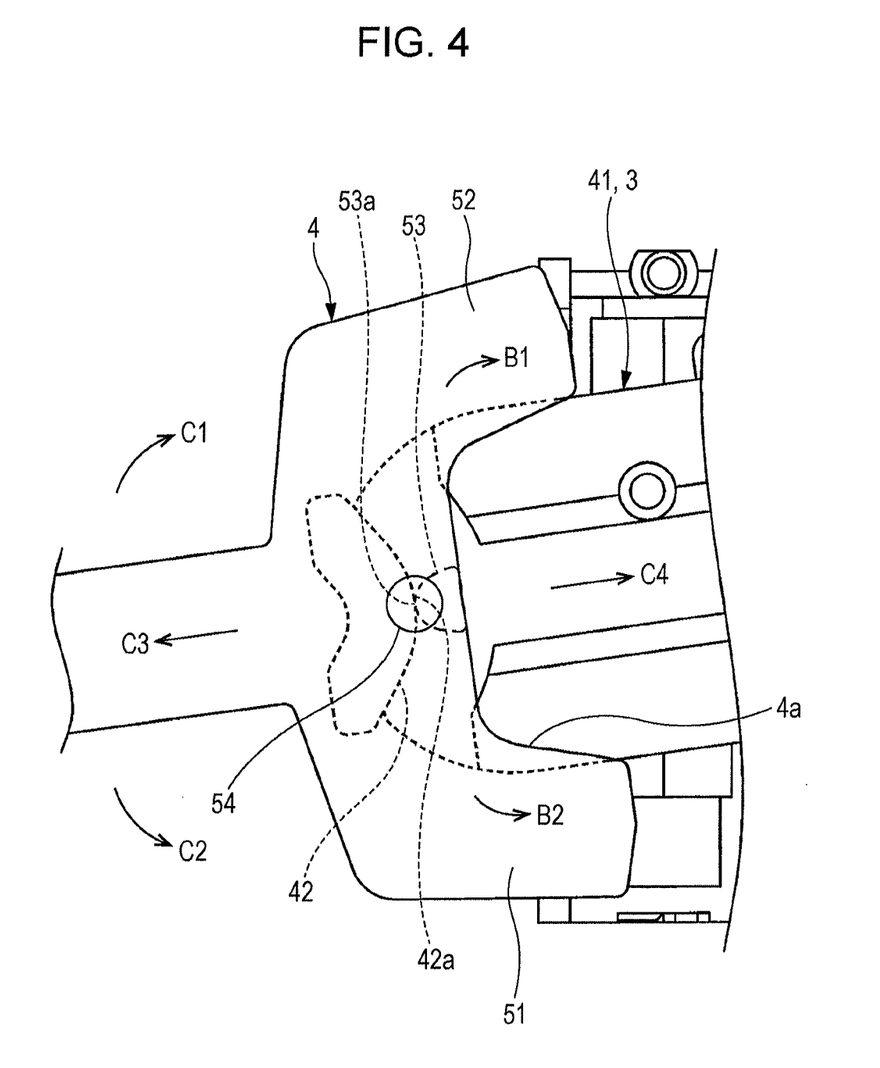
FIG. 4 is an enlarged view of relevant parts illustrated in FIG. 3A.

Referring to FIG. 4, when the operation lever 1 is at the neutral position, the engaging projection 53 provided on the upper surface of the cancel lever 4 engages with the engaging portion 42 of the holding member 3. The engaging projection 53 includes a surface having a first apex 53a on the steering-shaft side thereof. The engaging portion 42 includes a surface having a second apex 42a that comes into contact with the engaging projection 53. The engaging projection 53 and the engaging portion 42 are in contact with each other via the first apex 53a and the second apex 42a thereof. In this state, the cancel lever 4 is retracted from the turning locus of the cancel projection 6a with the third elastic member 14 greatly contracted. That is, the cancel lever 4 is elastically urged with a great force toward the turning locus of the cancel projection 6a.

To summarize, the cancel lever 4 is provided in the housing 2 with the third elastic member 14 in a contracted state interposed therebetween such that the cancel lever 4 is advanceable to a position over and retractable from the turning locus of the cancel projection 6a and is turnable back and forth. Thus, the third elastic member 14 and the cancel lever 4 are each formed of one component. Consequently, a cancel mechanism having a reduced number of components and a simple configuration is provided. Moreover, the individual components can each be provided in a small space. Consequently, the size of the turn signal switch device can be reduced. Furthermore, the first driven member 10 is attached to the base portion 20 of the operation lever 1 with the first elastic member 11 interposed therebetween such that the first driven member 10 is elastically in contact with the cam member 5. Thus, the elastic member for the operation lever 1 and the elastic member for the cancel mechanism are provided as separate components. Consequently, the design flexibility increases, realizing a turn signal switch device that provides a superior feeling of operation. Furthermore, the cancel lever 4 preferably has the recess 4a provided between the two arms 51 and 52 and the downward projection 54 projecting toward the inner surface of the housing 2. The housing 2 preferably has the oblong guide hole 35 that guides the downward projection 54 such that the downward projection 54 is advanceable toward and retractable from the turning locus of the cancel projection 6a. The second driven member 12 is preferably attached to the holding member 3 with the second elastic member 13 interposed therebetween such that the second driven member 12 is elastically in contact with the inner side surface of the cancel lever 4 defining the recess 4a. Therefore, even if the operation lever 1 having been latched at the right-turn-indicating position or the left-turn-indicating position is locked there, the operation lever 1 can be made to assuredly return to the neutral position automatically when the steering wheel is returned to its initial position after a right turn or a left turn is made, as described separately below.

Figure 3A:
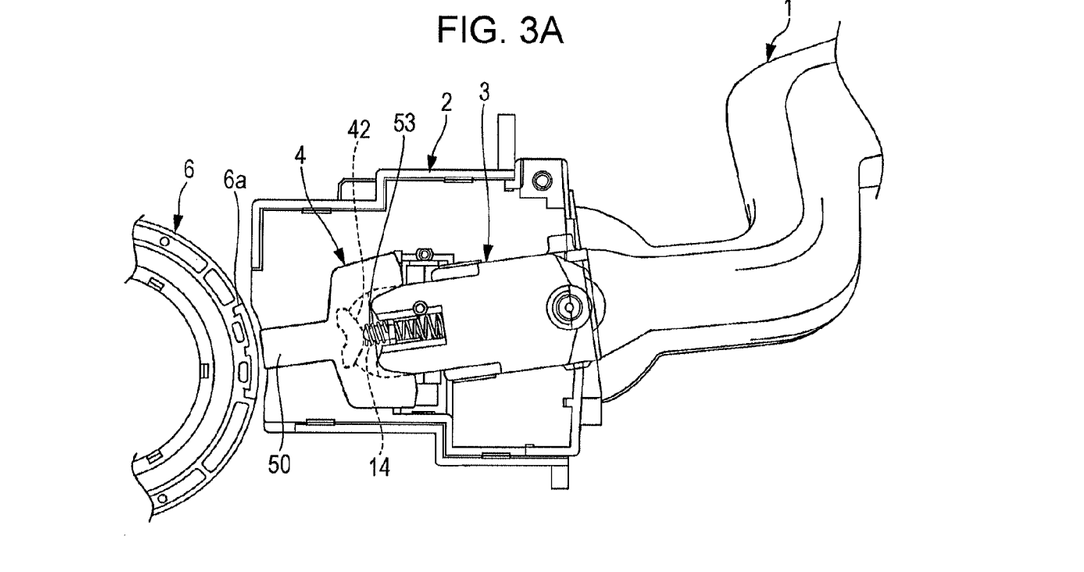
FIGS. 3A and 3B are plan views illustrating a transition in which an operation lever is turned from a neutral position to a right-turn-indicating position.
Figure 3B:
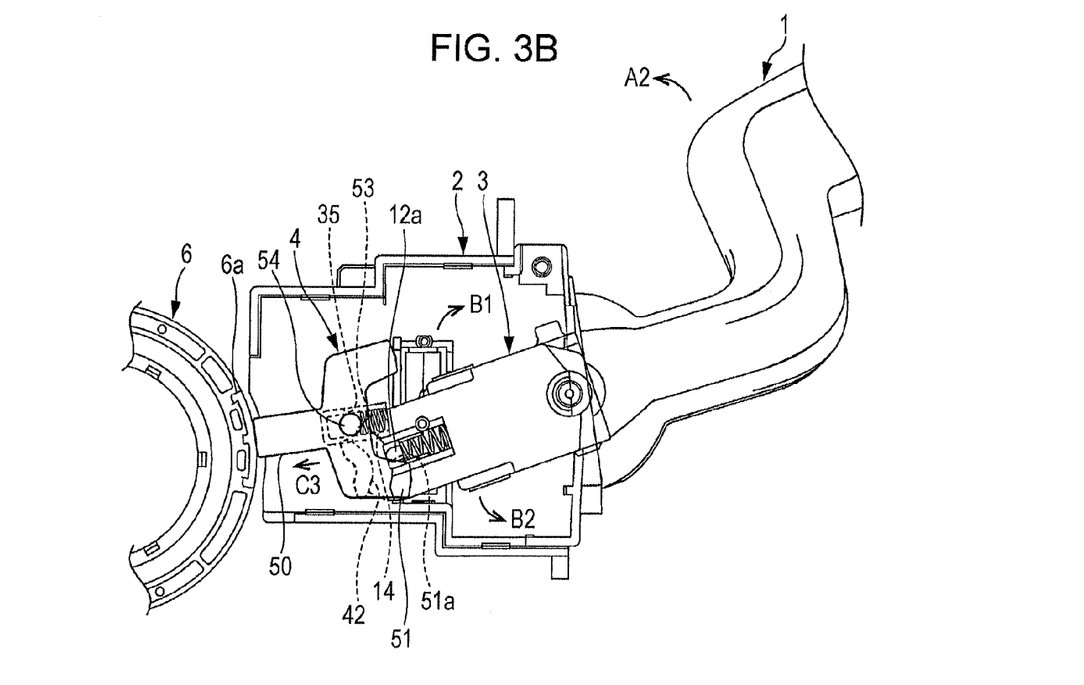

Now, how the turn signal switch device works will be described referring to FIGS. 3A to 9B. FIGS. 3A to 9B are each a bottom view of the turn signal switch device illustrated in FIG. 1, seen in the direction A3 illustrated in FIG. 1. Hence, the direction in which the operation lever 1 is turned for indicating a left turn (the direction A1 illustrated in FIG. 1) corresponds to the clockwise direction in FIGS. 3A to 9B, and the direction in which the operation lever 1 is turned for indicating a right turn (the direction A2 illustrated in FIG. 1) corresponds to the counterclockwise direction in FIGS. 3A to 9B. In FIGS. 3A to 9B, irrelevant components are not illustrated. First, a case will be described where, after the operation lever 1 is turned to the right-turn-indicating position and is latched there, a right turn is made by turning the steering wheel to the right and the steering wheel is subsequently turned in the reverse direction (to the left), whereby the operation lever 1 automatically returns to the neutral position. FIGS. 3A and 3B are plan views illustrating a transition in which the operation lever 1 is turned from the neutral position to the right-turn-indicating position.

The cancel projection 6a is provided on the outer circumference of a ring-shaped cancel cam member 6. Therefore, the turning locus of the cancel projection 6a is formed along the outer circumference of the cancel cam member 6.

FIG. 3A illustrates a state where the operation lever 1 is at the neutral position. In this state, the engaging projection 53 of the cancel lever 4 engages with the engaging portion 42 of the holding member 3, and the projection 50 of the cancel lever 4 is retracted from the turning locus of the cancel projection 6a.

As illustrated in FIG. 3A, the cancel projection 6a of the cancel cam member 6 faces the tip of the projection 50 of the cancel lever 4.

FIG. 4 is an enlarged view of relevant parts illustrated in FIG. 3A.

Referring to FIG. 4, when the operation lever 1 is turned in the direction A1 or the direction A2, the holding member 3 turns in the direction B1 or the direction B2 and the cancel lever 4 moves in the direction C3. The cancel lever 4 is constantly elastically urged toward the steering-shaft side (in the direction C3) by the third elastic member 14 (see FIG. 2). Therefore, when the engaging portion 42 turns with the turning of the holding member 3, the engaging projection 53 of the cancel lever 4 slides along the engaging portion 42 and drops off the end of the engaging portion 42. Consequently, the cancel lever 4 moves in the direction C3.

FIG. 3B illustrates a state where the operation lever 1 has reached the right-turn-indicating position. When the operation lever 1 is turned to the right-turn-indicating position, the holding member 3 is turned in the direction B2 and the engaging projection 53 disengages from the engaging portion 42 of the holding member 3, whereby the cancel lever 4 moves in the direction C3, as described above. In this movement, the tip 10a of the first driven member 10 illustrated in FIG. 2 slides along the cam surface 60 and engages with a corresponding one of the latching projections 61, whereby the operation lever 1 is latched.

Since the steering wheel is not turned in this movement, the tip of the projection 50 of the cancel lever 4 moving in the direction C3 comes into contact with and is pressed against the outer peripheral surface of the cancel projection 6a. Furthermore, the pushed portion 12a illustrated in FIG. 2 comes into contact with or comes close to the first pushing surface 51a of the first arm 51. In this state, the downward projection 54 provided on the lower surface of the cancel lever 4 resides in the middle of the oblong guide hole 35 provided in the housing 2.

Figure 5A:
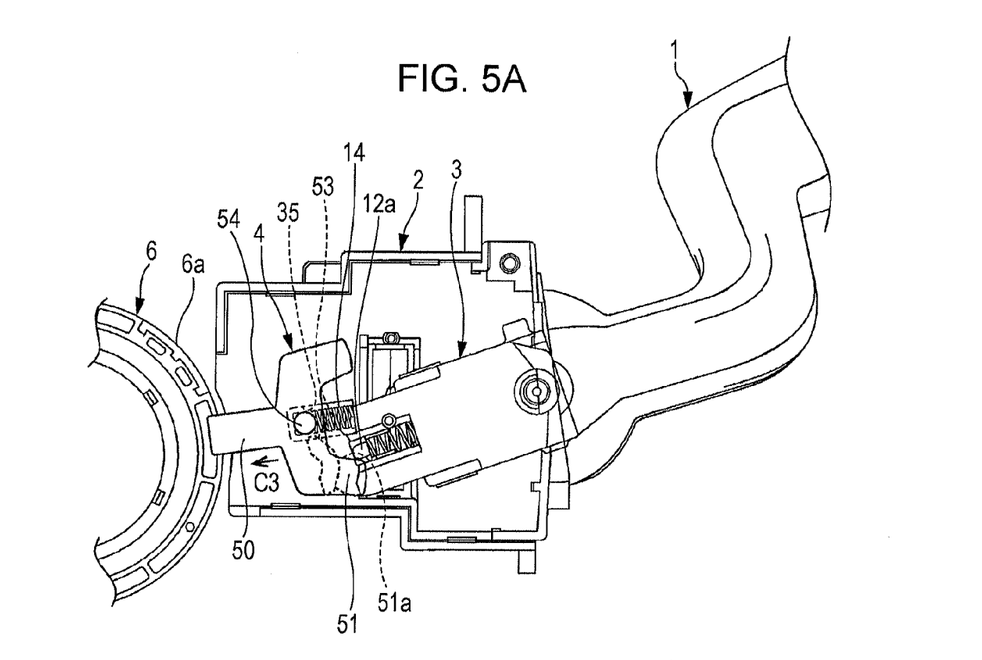
FIGS. 5A and 5B are plan views illustrating a transition in which the operation lever having been at the right-turn-indicating position starts to automatically return toward the neutral position.
Figure 5B:
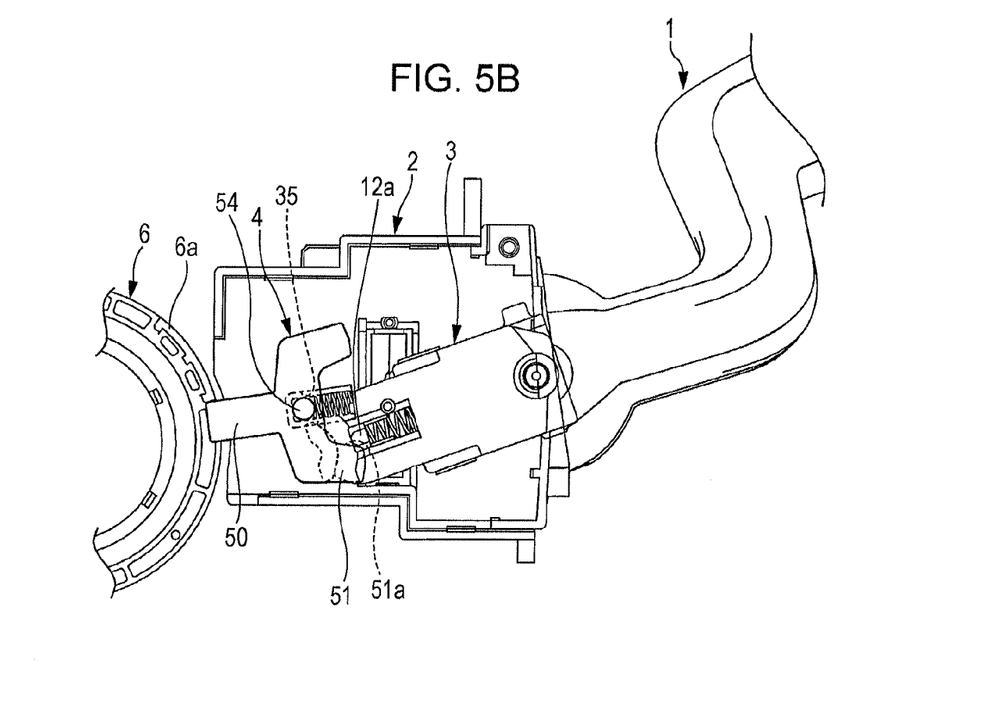

FIGS. 5A and 5B are plan views illustrating a transition in which the operation lever 1 having been at the right-turn-indicating position starts to automatically return toward the neutral position. FIG. 5A illustrates a state where the steering wheel has been turned to the right from the position illustrated in FIG. 3B. When the steering wheel is turned to the right, the cancel cam member 6 turns to the right, whereby the cancel projection 6a moves away from the tip of the projection 50. Consequently, the cancel lever 4, which is elastically urged by the third elastic member 14, moves in the direction C3, and the projection 50 advances to a position over the turning locus of the cancel projection 6a. Meanwhile, the downward projection 54 (the cancel lever 4) illustrated in FIG. 2 moves in the direction C3 within the oblong guide hole 35 of the housing 2.

FIG. 5B illustrates a state where the steering wheel having been turned to the right for making a right turn is being turned to the left toward its initial position. When the steering wheel is turned to the right as illustrated in FIG. 5A, the projection 50 of the cancel lever 4 advances to a position over the turning locus of the cancel projection 6a. Therefore, when the steering wheel having been turned to the right is returned toward its initial position, the cancel projection 6a comes into contact with a side face of the projection 50 of the cancel lever 4.

Figure 6A:
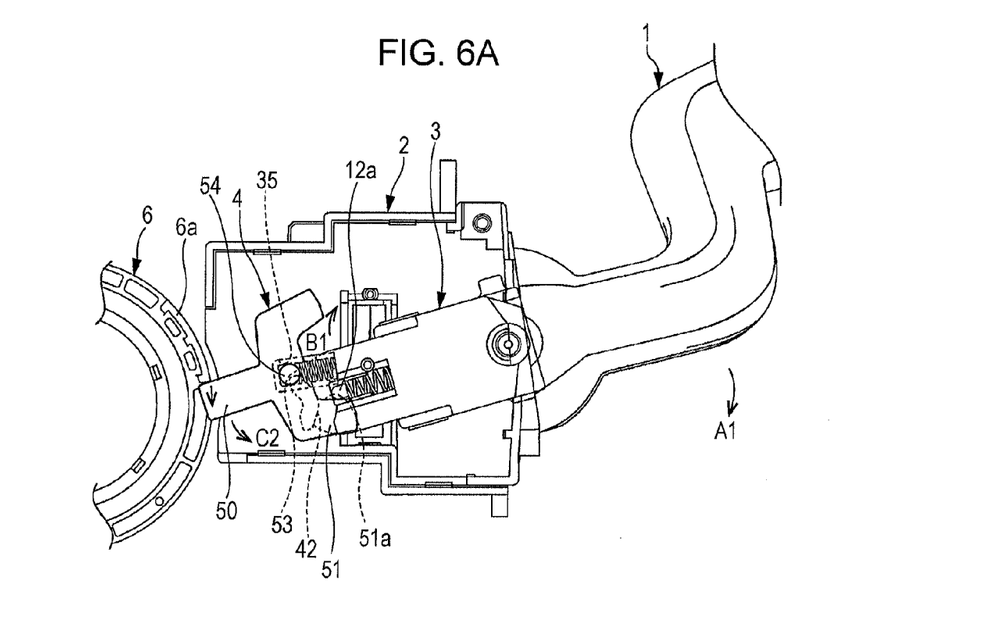
FIGS. 6A and 6B are plan views illustrating a transition in which the operation lever having been at the position illustrated in FIG. 5B automatically return to the neutral position.
Figure 6B:
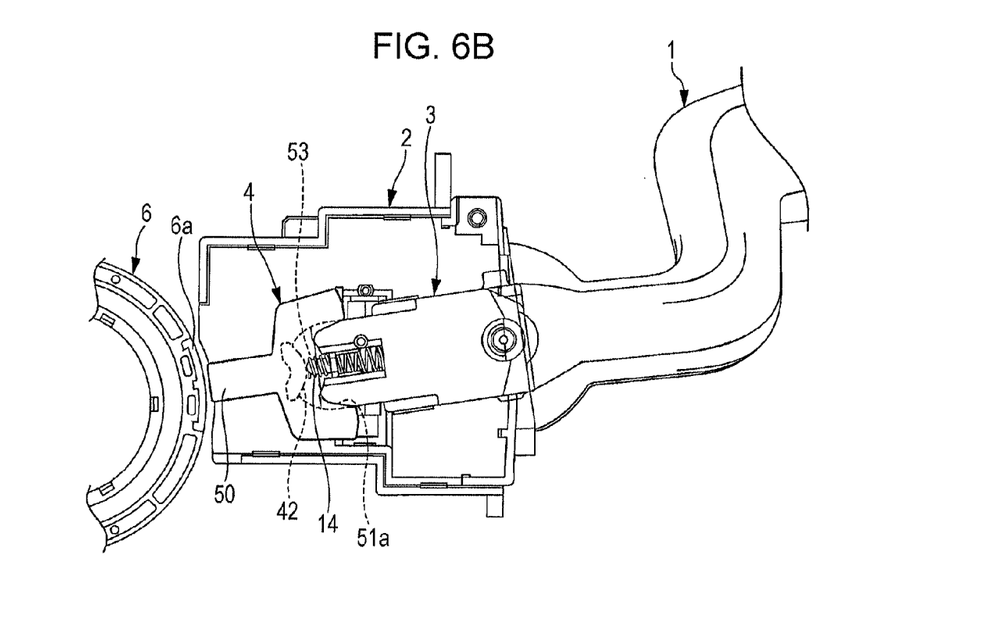

FIGS. 6A and 6B are plan views illustrating a transition in which the operation lever 1 having been at the position illustrated in FIG. 5B automatically returns to the neutral position. FIG. 6A illustrates a state where the steering wheel is further turned to the left from the position illustrated in FIG. 5B. As the steering wheel is turned toward its initial position, the cancel projection 6a pushes the side face of the projection 50 of the cancel lever 4 and the cancel lever 4 turns in the direction C2. In response to this, the first pushing surface 51a of the first arm 51 of the cancel lever 4 pushes the pushed portion 12a of the holding member 3 in the direction B1, whereby the operation lever 1 turns in the direction A1. Then, the tip 10a of the first driven member 10 goes over the latching projection 61 of the cam surface 60, and the operation lever 1 having been latched is released, whereby the holding member 3 automatically returns to its initial position with the urging force exerted by the first elastic member 11. In this manner, the operation lever 1 automatically returns to the neutral position.

As the holding member 3 is turned toward its initial position during the transition from the state illustrated in FIG. 6A to the state illustrated in FIG. 6B, the engaging projection 53 of the cancel lever 4 comes into contact with the end of the engaging portion 42 of the holding member 3 and climbs up the engaging portion 42, whereby the engaging projection 53 is pushed away from the turning locus of the cancel projection 6a by the engaging portion 42. Consequently, the engaging projection 53 returns to the position illustrated in FIG. 3A.

FIG. 6B illustrates a state where the steering wheel has been returned to its initial position and the cancel movement of the operation lever 1 has been complete. In the state illustrated in FIG. 6B, the components are positioned the same as in FIG. 3A.

As described above, the operation lever 1 is turned to the right-turn-indicating position, where the operation lever 1 is latched. Subsequently, the steering wheel is turned to the right so as to make a right turn. After making the right turn, the steering wheel is returned to its initial position. This moves the cancel lever 4, whereby the operation lever 1 automatically returns to the neutral position. In the turn signal switch device according to the embodiment of the present disclosure, even if the operation lever 1 that have been latched at the right-turn-indicating position is locked for some reason, the cancel lever 4 turns when a force greater than a certain magnitude is applied thereto from the cancel projection 6a, whereby the cancel movement is realized. This mechanism will now be described.

Figure 7A:
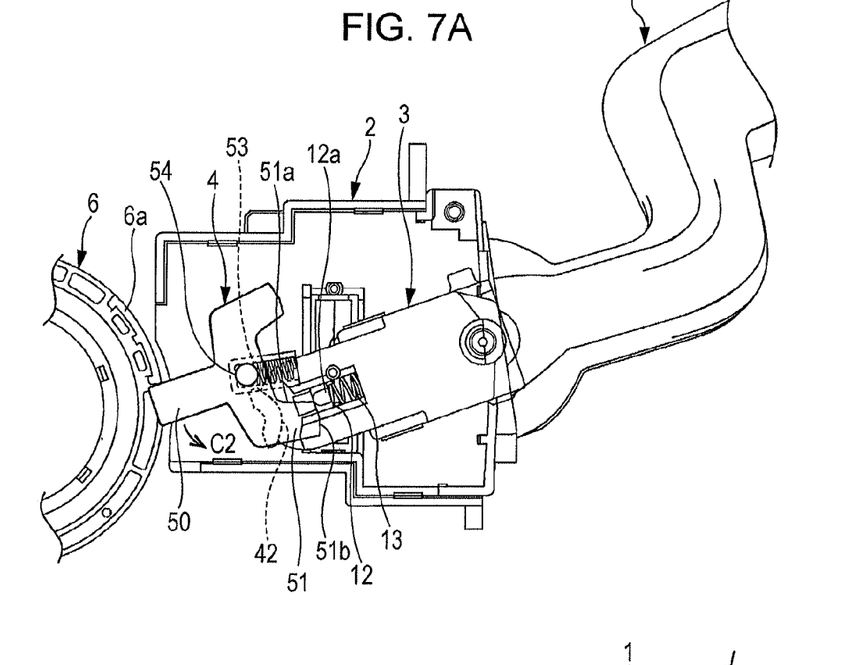
FIGS. 7A and 7B are plan views illustrating a transition in which the operation lever having been locked at the right-turn-indicating position starts to automatically return toward the neutral position.
Figure 7B:
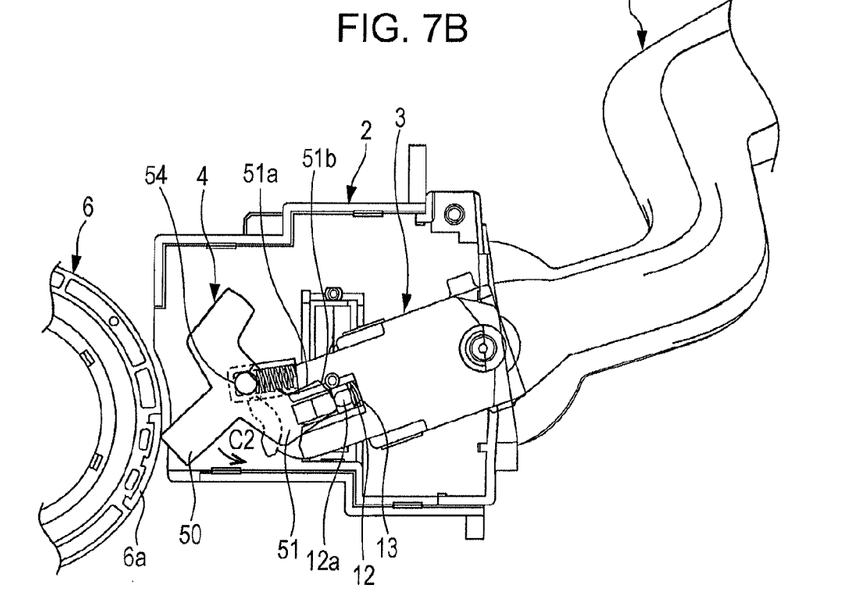

FIGS. 7A and 7B are plan views illustrating a transition in which the operation lever 1 having been locked at the right-turn-indicating position starts to automatically return toward the neutral position. If the steering wheel is turned toward its initial position while the operation lever 1 in a latched state is locked, the holding member 3 does not turn. Therefore, the cancel lever 4 receives a force greater than a certain magnitude from the cancel projection 6a that is turning in the clockwise direction in the drawing, and the cancel lever 4 is turned in the direction C2 while the first pushing surface 51a pushes the pushed portion 12a (see FIG. 2) toward the operation-lever side. As illustrated in FIG. 2, the second driven member 12 including the pushed portion 12a is attached to the holding member 3 with the second elastic member 13 interposed therebetween. Therefore, when the cancel lever 4 is pushed by the cancel projection 6a with a force greater than a certain magnitude, the first pushing surface 51a pushes the pushed portion 12a and the second driven member 12 is moved toward the operation-lever side.

Thus, when the cancel lever 4 is turned while the holding member 3 is held still, referring to FIG. 7A, the first pushing surface 51a of the cancel lever 4 pushes the pushed portion 12a against the elastic urging force exerted by the second elastic member 13, whereby the cancel lever 4 is turned in the direction C2.

When the steering wheel in the state illustrated in FIG. 7A is further turned toward its initial position, referring now to FIG. 7B, the cancel lever 4 is further turned in the direction C2. In this movement, the contact position between the pushed portion 12a and the first arm 51 of the cancel lever 4 shifts from the first pushing surface 51a to the second pushing surface 51b, and the tip of the projection 50 slides along the outer peripheral surface of the cancel projection 6a. As the cancel lever 4 continues to be turned, the projection 50 retracts from the cancel projection 6a. Consequently, the elastic urging force exerted by the second elastic member 13 causes the cancel lever 4 and the operation lever 1 to return to the respective positions illustrated in FIG. 3A, and the cancel movement is complete. Thus, when the steering wheel is turned to the left to its initial position while the operation lever 1 is locked at the right-turn-indicating position, the cancel lever 4 continues to turn and the projection 50 retracts from the turning locus of the cancel projection 6a. Therefore, the components are prevented from being damaged. The operation lever 1 that have been latched is released in the transition from the state illustrated in FIG. 7A to the state illustrated in FIG. 7B.

Referring now to FIGS. 8A to 9B, how the operation lever 1 having been latched at the left-turn-indicating position automatically returns to the neutral position will be described briefly. When the operation lever 1 in the state illustrated in FIG. 3A is turned toward the left-turn-indicating position, the holding member 3 turns in the direction B1 and the engaging portion 42 of the holding member 3 disengages from the engaging projection 53 of the cancel lever 4. Furthermore, the projection 50 of the cancel lever 4 advances toward the turning locus of the cancel projection 6a and comes into contact with the outer peripheral surface of the cancel projection 6a. In this state, when the steering wheel is turned to the left so as to make a left turn, the cancel projection 6a turns and the projection 50 of the cancel lever 4 advances to a position over the turning locus of the cancel projection 6a with the elastic urging force exerted by the third elastic member 14.

Figure 8A:
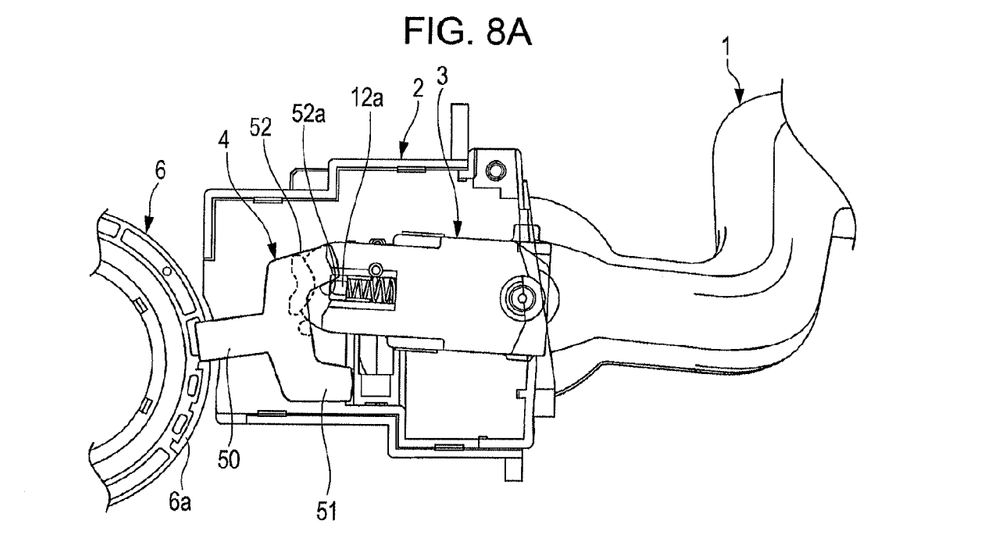
FIGS. 8A and 8B are plan views illustrating a transition in which the operation lever having been at a left-turn-indicating position starts to automatically return toward the neutral position.
Figure 8B:
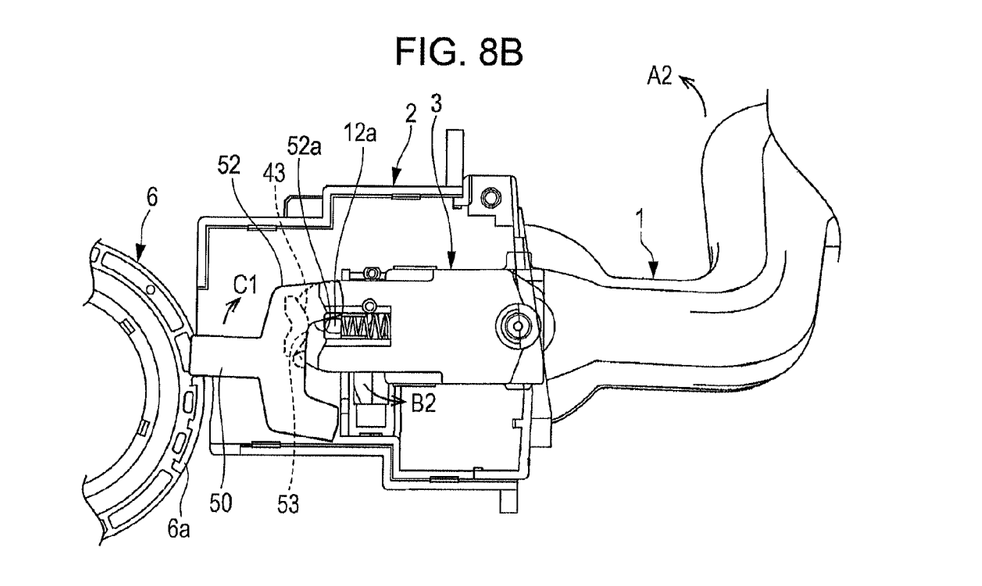

FIGS. 8A and 8B are plan views illustrating a transition in which the operation lever 1 having been at the left-turn-indicating position starts to automatically return toward the neutral position. FIG. 8A illustrates a state where the steering wheel having been turned to the left is being turned to the right and the cancel projection 6a has come into contact with the projection 50 of the cancel lever 4. FIG. 8B illustrates a state where the steering wheel has been further turned to the right. In FIG. 8B, since the cancel lever 4 is turned in the direction C1, the first pushing surface 52a of the second arm 52 pushes the pushed portion 12a in the clockwise direction in the drawing. Consequently, the holding member 3 is turned in the direction B2, and the operation lever 1 is turned in the direction A2.

When the steering wheel is further turned to the right, the operation lever 1 having been latched at the left-turn-indicating position is released and is turned in the direction A2 in such a manner as to automatically return to the neutral position. Thus, the operation lever 1 and the cancel lever 4 automatically return to the positions illustrated in FIG. 6B, and the cancel movement is complete.

Figure 9A:
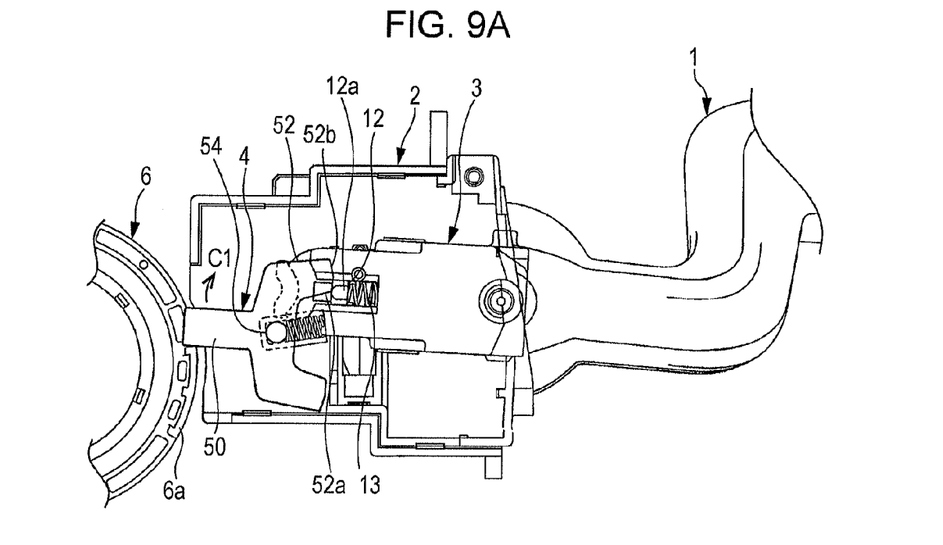
FIGS. 9A and 9B are plan views illustrating a transition in which the operation lever having been locked at the left-turn-indicating position starts to automatically return toward the neutral position.
Figure 9B:
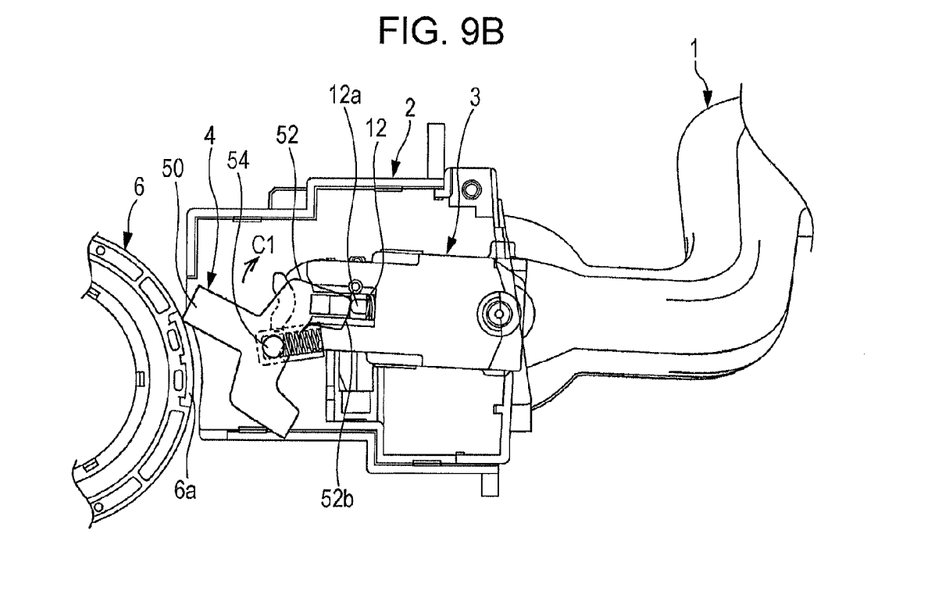

FIGS. 9A and 9B are plan views illustrating a transition in which the operation lever 1 having been latched and locked at the left-turn-indicating position starts to automatically return toward the neutral position. When the steering wheel is turned to the right, the cancel lever 4 is turned in the direction C1 as illustrated in FIG. 9A. In response to this, the first pushing surface 52a of the cancel lever 4 pushes the pushed portion 12a against the elastic urging force exerted by the second elastic member 13, whereby the cancel lever 4 moves toward the operation-lever side.

When the steering wheel in the state illustrated in FIG. 9A is further turned to the right, the cancel lever 4 is further turned in the direction C1 as illustrated in FIG. 9B and the tip of the projection 50 slides along the outer peripheral surface of the cancel projection 6a. As the cancel lever 4 continues to be turned, the projection 50 retracts from the turning locus of the cancel projection 6a. Thus, even if the operation lever 1 is locked, the cancel lever 4 can turn and the components are prevented from being damaged.

To summarize, the turn signal switch device according to the embodiment of the present disclosure is configured as follows. The cancel lever 4 is provided in the housing 2 with the third elastic member 14 in a contracted state interposed therebetween such that the cancel lever 4 is advanceable to a position over and retractable from the turning locus of the cancel projection 6a and is turnable back and forth. Thus, the third elastic member 14 and the cancel lever 4 are each formed of one component. Consequently, a cancel mechanism having a reduced number of components and a simple configuration is provided. Moreover, the individual components can each be provided in a small space. Consequently, the size of the turn signal switch device can be reduced. Furthermore, the first driven member 10 is attached to the base portion 20 of the operation lever 1 with the first elastic member 11 interposed therebetween such that the first driven member 10 is elastically in contact with the cam member 5. Thus, the elastic member for the operation lever 1 and the elastic member for the cancel mechanism are provided as separate components. Consequently, the design flexibility increases, realizing a turn signal switch device that provides a superior feeling of operation.

While embodiments of the present disclosure have been described above, the present disclosure is not limited the above embodiments, and various modifications can be made to the above embodiments within the technical scope of the present disclosure.

What is claimed is:

1. A turn signal switch device comprising:
an operation lever;
a holding member configured to support a base portion of the operation lever such that the operation lever is turnable in a first plane;
a housing configured to support the holding member such that the holding member is turnable in a second plane intersecting the first plane;
a cancel lever provided in the housing with a cancelling elastic member in a contracted state interposed therebetween, the cancel lever being configured to be turnable and to be advanceable to a position over and retractable from a turning locus of a cancel projection provided to a steering shaft;
a cam member provided in the housing and facing the base portion of the operation lever; and
a first driven member provided at the base portion of the operation lever with a first elastic member interposed therebetween, the first driven member being elastically in contact with the cam member,
wherein the cam member includes
a central portion configured to anchor the first driven member when the operation lever is at a neutral position;
a plurality of latching projections each configured to anchor the first driven member at least when the operation lever is at a corresponding one of a left-turn-indicating position and a right-turn-indicating position; and
a sloping surface extending in a portion excluding the central portion and the plurality of latching projections and configured to elastically urge the first driven member toward the central portion,
wherein the cancel lever comprises an engaging projection including a surface having a first apex on a side of the engaging projection nearer to the turning locus,
wherein the holding member comprises an engaging portion including a surface having a second apex configured to come into contact with the engaging projection when the operation lever is at the neutral position,
wherein the cancel lever is retracted from the turning locus when the operation lever is at the neutral position,
wherein the cancel lever comprises:
a projection projecting toward the turning locus and configured to be advanceable to the position over and retractable from the turning locus;
two arms having a recess therebetween and extending in a direction opposite to a direction in which the projection projects; and
a downward projection projecting toward an inner surface of the housing,
wherein the housing comprises an oblong guide hole along which the downward projection is guided in such a manner as to be movable back and forth with respect to the turning locus, and
wherein the holding member is provided with a second driven member with a second elastic member interposed therebetween such that the second driven member is elastically in contact with an inner side surface of the cancel lever defining the recess.

2. The turn signal switch device according to claim 1, wherein the holding member includes a projecting portion projecting toward the turning locus and having a receiving hole, the second driven member being guided along the receiving hole in such a manner as to be movable back and forth, and
wherein the second driven member includes a pushed portion extending through the receiving hole into the recess and pressed against the inner side surface of the cancel lever defining the recess.

3. The turn signal switch device according to claim 2, wherein the cam member is provided on one side of the projecting portion,
wherein the cancel lever is provided on another side of the projecting portion, wherein the engaging portion is provided on the projecting portion and is positioned on a side of the receiving hole nearer to the turning locus.

4. The turn signal switch device according to claim 1, wherein the cancel lever comprises a holding portion projecting in the direction in which the two arms extend, wherein the housing comprises a cancel-lever-holding portion facing the holding portion, and wherein the cancelling elastic member has one end thereof held by the holding portion and another end thereof held by the cancel-lever-holding portion.

\* \* \* \* \*